(12) United States Patent
Kuo

(10) Patent No.: US 7,036,971 B2
(45) Date of Patent: May 2, 2006

(54) LIGHT GUIDING FRAME WITH A PLURALITY OF GUIDING TRACKS

(76) Inventor: Chia Shin Kuo, P.O. Box 26-757, Taipei (TW)

( * ) Notice: Subject to any disclaimer, the term of this patent is extended or adjusted under 35 U.S.C. 154(b) by 215 days.

(21) Appl. No.: 10/681,808

(22) Filed: Oct. 6, 2003

(65) Prior Publication Data

US 2005/0073857 A1    Apr. 7, 2005

(51) Int. Cl.
*F21V 7/04* (2006.01)
(52) U.S. Cl. ............... 362/616; 362/623; 362/612; 362/558; 362/800
(58) Field of Classification Search ............ 362/560, 362/616, 628, 555, 27, 577, 558, 559, 581, 362/26, 623, 612, 800; 349/61, 65; 385/132, 385/133, 901
See application file for complete search history.

(56) References Cited

U.S. PATENT DOCUMENTS 4,172,631 A * 10/1979 Yevick ..................... 385/115
5,233,679 A * 8/1993 Oyama ..................... 385/146
5,590,945 A * 1/1997 Simms ...................... 362/623
5,938,324 A * 8/1999 Salmon et al. ............. 362/555
5,984,485 A * 11/1999 Poli et al. .................. 362/26
5,988,827 A * 11/1999 Lee ........................... 362/633
6,123,442 A * 9/2000 Freier et al. ............... 362/559
6,270,243 B1 * 8/2001 Simon ....................... 362/560
6,366,409 B1 * 4/2002 Umemoto et al. ......... 359/628

* cited by examiner

*Primary Examiner*—Sandra O'Shea
*Assistant Examiner*—Gunyoung T. Lee
(74) *Attorney, Agent, or Firm*—Rosenberg, Klein & Lee

(57) ABSTRACT

A light guiding frame with a plurality of guiding tracks is used in a backlight module of a display device with a lighting member. The light guiding frame includes one (or two) forked lighting member, a reflection member enclosing the forked lighting member, and a light-guide member connected to the forked lighting member and having a predetermined shape. The forked lighting member has a containing portion receiving the light member and guiding tracks extending from the containing portion for transmitting light emitted from the lighting member to the light-guide member. The light-guide member is shaped to meet a particular requirement of linearly or circularly shaped displaying region.

17 Claims, 4 Drawing Sheets

US 7,036,971 B2

LIGHT GUIDING FRAME WITH A PLURALITY OF GUIDING TRACKS

BACKGROUND OF THE INVENTION

1. Field of the Invention

The present invention relates to a light guide. More particularly, the present invention relates to a light guide frame with a plurality of light guiding tracks, which provides lighting regions of different shapes, such as a line-shape or a circular shape.

2. Background of the Invention

The backlight modules, which provide lighting, are broadly used in various electronic devices, such as cell phones, notebooks, screen or a keystroke of PDAs, Touch pads, Pointing Sticks, etc.

If a particularly shaped lighting arrangement is needed, e.g., in the shape of a line or loop positioned along a border of a display, conventionally a plurality of lighting members, such as LEDs are arranged along the display according to the predetermined shape. However, the usage of a plurality of LEDs located at particular positions is costly. Also, the LEDs usually are spaced apart predetermined intervals from each other instead of being arranged in a side-by-side manner, that causes the unevenness of the luminance value at the conventional display.

Hence, the improvement over the prior art is required to overcome the disadvantages thereof.

SUMMARY OF THE INVENTION

The object of the invention is therefore to provide a low cost light guiding frame with a plurality of light guiding tracks, which provides high luminance and high uniformity value of the light which is emitted, following a predetermined shape, such as linear or loop-like.

According to the invention, this object is achieved by forming a light guiding frame with a plurality of guiding tracks, which is adopted for a backlight module having at least one lighting member. The light guiding frame includes at least one forked lighting member, a reflection member enclosing the forked lighting member, and a light-guide member connected to the forked lighting member and having a predetermined shape. The forked lighting member has a containing portion receiving the lighting member and a plurality of guiding tracks extending from the containing portion. The tracks transmit light emitted from the lighting member to the light-guide member which is a lighting element having a predetermined shape.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the Claims appended hereto.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE EMBODIMENTS

Figure 1:
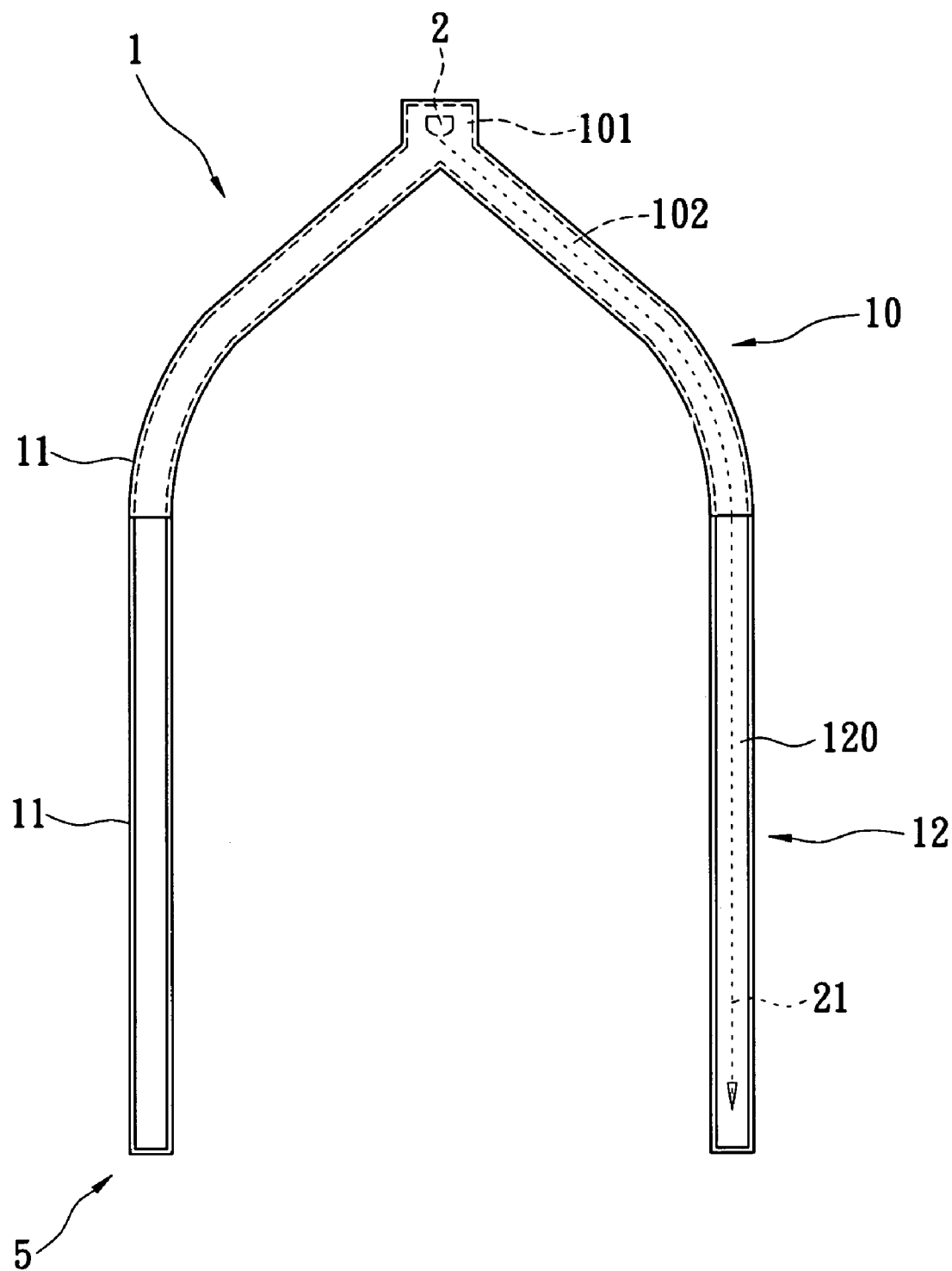
FIG. 1 is a perspective view of a first embodiment of the present invention.

Referring to FIG. 1, the present invention provides a light guiding frame 1 with a plurality of guiding tracks and may be used in a backlight module having at least one lighting member 2. The lighting member 2 is LED (Light Emitting Display). The light guiding frame 1 includes at least one forked lighting member 10, a reflection member 11 enclosing the forked lighting member 10, and a light-guide member 12 connected to the forked lighting member 10 and having a predetermined shape. The forked lighting member 10 includes a containing portion 101 receiving the lighting member 2 and a plurality of tracks 102 extending from the containing portion 101 for transmitting the light emitting from the lighting member 2 to the light-guide member 12. The light-guide member 12 forms a displaying area 5 which may have various shapes, including a line-shaped and a loop-shaped light-guide member. The reflection member 11 encloses a side surface and further a bottom surface of the light-guide member 12, so that the light of the lighting member 2 emits outwardly through a top surface of the light-guide member 12 for providing the high luminance thereof.

The light-guide member 12 includes a plurality of light-guide stripes 120 respectively related to the tracks 102, so that the light is transmitted therealong and follows a first path 21 in the displaying area 5, thus forming two parallel lines, as best shown in FIG. 1.

Figure 2:
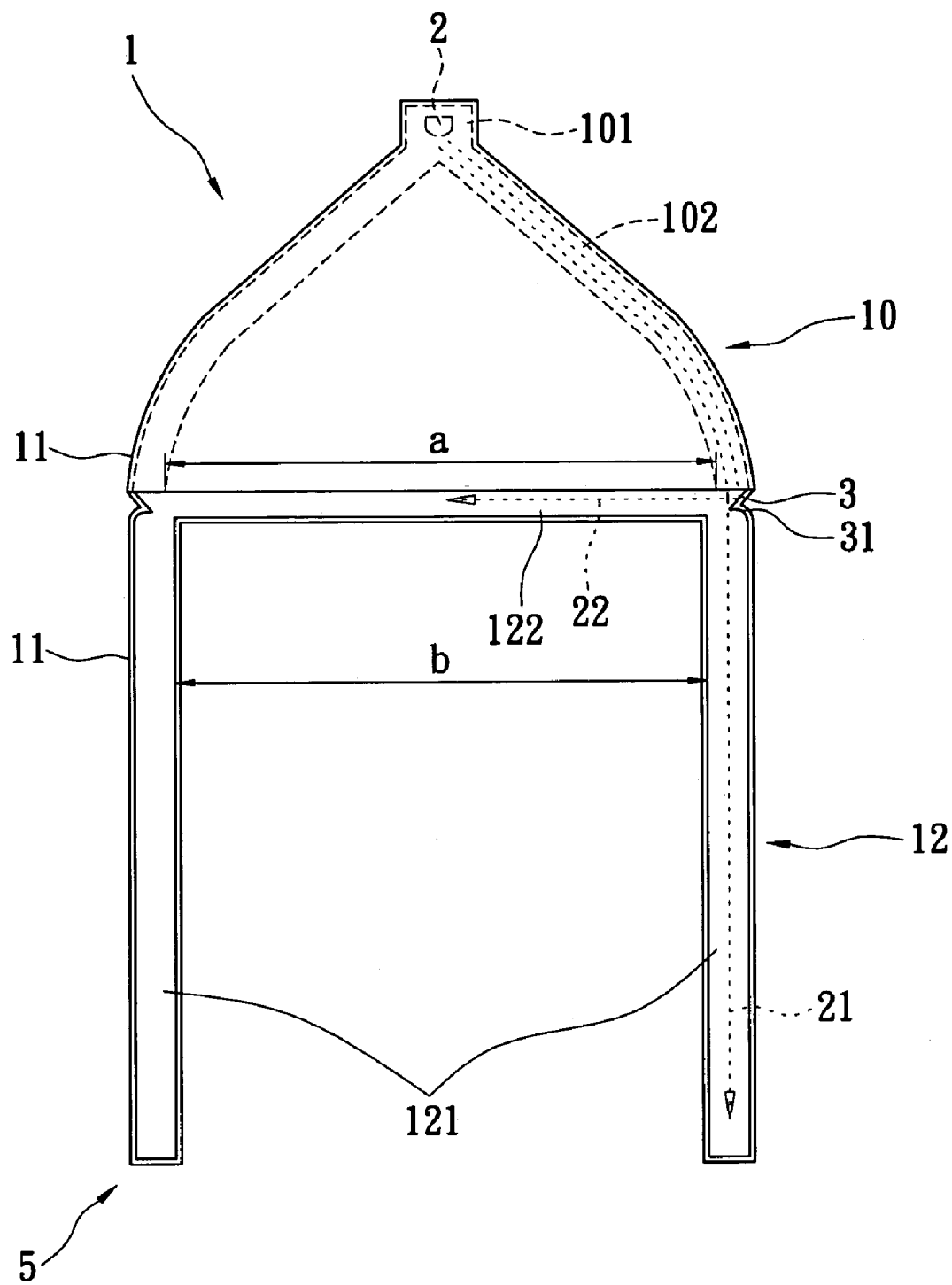
FIG. 2 is a perspective view of a second embodiment of the present invention.

With respect to FIG. 2, the light-guide member 12 has a U shape, and includes two first light-guide stripes 121 and a second light-guide stripe 122 connecting the two first light-guide stripes 121 at the first ends thereof. The second light-guide stripe 122 also connects with the tracks 102. The two first-light-guide stripes 121 respectively have two inner side edges. As shown in FIG. 2, the outmost tracks 102 and the second light-guide stripe 122 form an inner triangle. The inner side edges of the first light-guide stripes 121 are spaced a distance "b" therebetween. The distance "b" is shorter than a length of a bottom line "a" of the inner triangle in order to attain effective transmission of the light along the first path 21 and for reducing optical losses.

Referring again to FIG. 2, the second light-guide stripe 122 has a plurality of reflecting faces 3 respectively corresponding to the tracks 102. The light transmitted along the tracks 102 splits at the reflecting faces 3 and further follows along a second path 22 and along the path 21. Each reflecting face 3 has a variable depth for adjusting a luminous flux, and further includes a plurality of round corners 31 to avoid the light concentration at the corners 31.

The present invention uses the light-guide member 12 formed of the light-guide stripes 120 (as in FIG. 1) or having a U shape (as in FIG. 2) to meet different requirements and to decrease the number of the lighting members 2 to reduce manufacturing costs.

Figure 3:
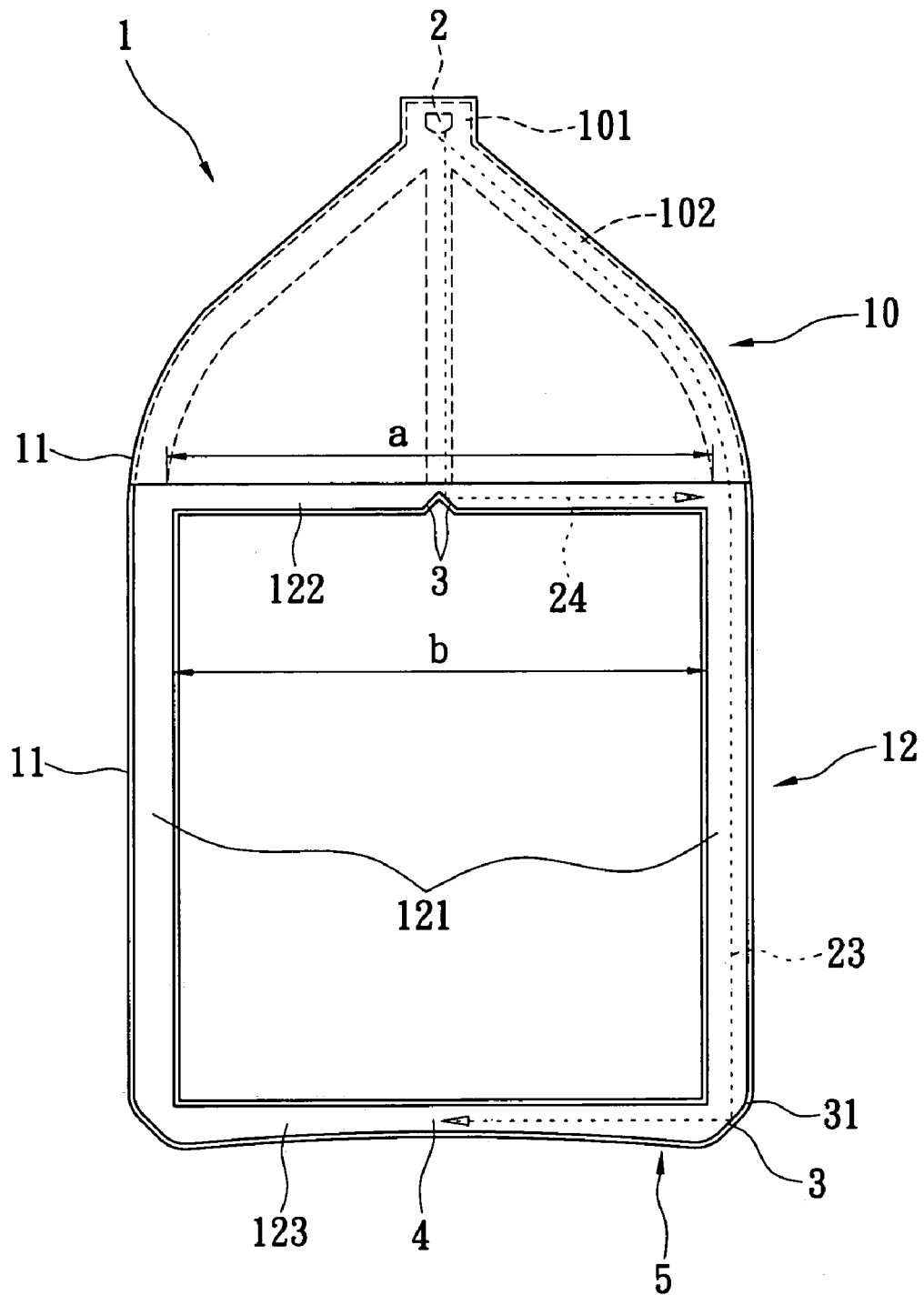
FIG. 3 is a perspective view of a third embodiment of the present invention.

With respect to FIG. 3, the light-guide member 12 has a rectangular shape and includes two first light-guide stripes 121, a second light-guide stripe 122 connecting two first ends of the two first light-guide stripes 121, and a third light-guide stripe 123 connecting two second ends of the two first light-guide stripes 121. The two first light-guide stripes 121 respectively have two inner side edges. Two outmost tracks 102 and the second light-guide stripe 122 outline an inner triangle. The two inner side edges of the light-guide stripes 121 are spaced a distance "b" therebetween. The distance "b" is shorter than a bottom line "a" of the inner triangle for attaining effective transmission of the light along the first path 21 and for reducing optical losses.

Referring again to FIG. 3, the third light-guide stripe 123 has a gradually-narrowing section 4 formed in a middle area thereof to reach high luminance according to a principle of that the brightness equals to the luminous flux per unit cross-section area. When the luminous flux is fixed, the luminance increases as the unit cross-section area decreases.

Shown in FIG. 1 and FIG. 2, where the number of the tracks 102 is two, the two tracks 102 are respectively connected to the light-guide stripes 120 or to the first light-guide stripes 121 of the U-shaped light-guide member 12 in a one-to-one manner, so that the light is transmitted along the first path 21. Each of the second light-guide stripes 122 of the U-shaped light-guide member 12 has two reflecting faces 3 respectively corresponding to the tracks 102 for transmission of the light along the path 22.

As shown in FIG. 3, the number of the tracks 102 is three, wherein two outer tracks 102 respectively are connected to the first light-guide stripes 121. In this arrangement, the second light-guide stripe 122 includes two opposing reflecting faces 3 formed thereat both corresponding to a third (middle) track 102 which extends between the two outer tracks 102 for the light transmission along the path 23. The luminous flux of the middle of the tracks 102 can be varied by a width thereof.

The arrangement of the present invention with a rectangular frame provides a loop-shaped displaying area 5 with highly uniform light emission.

Figure 4:
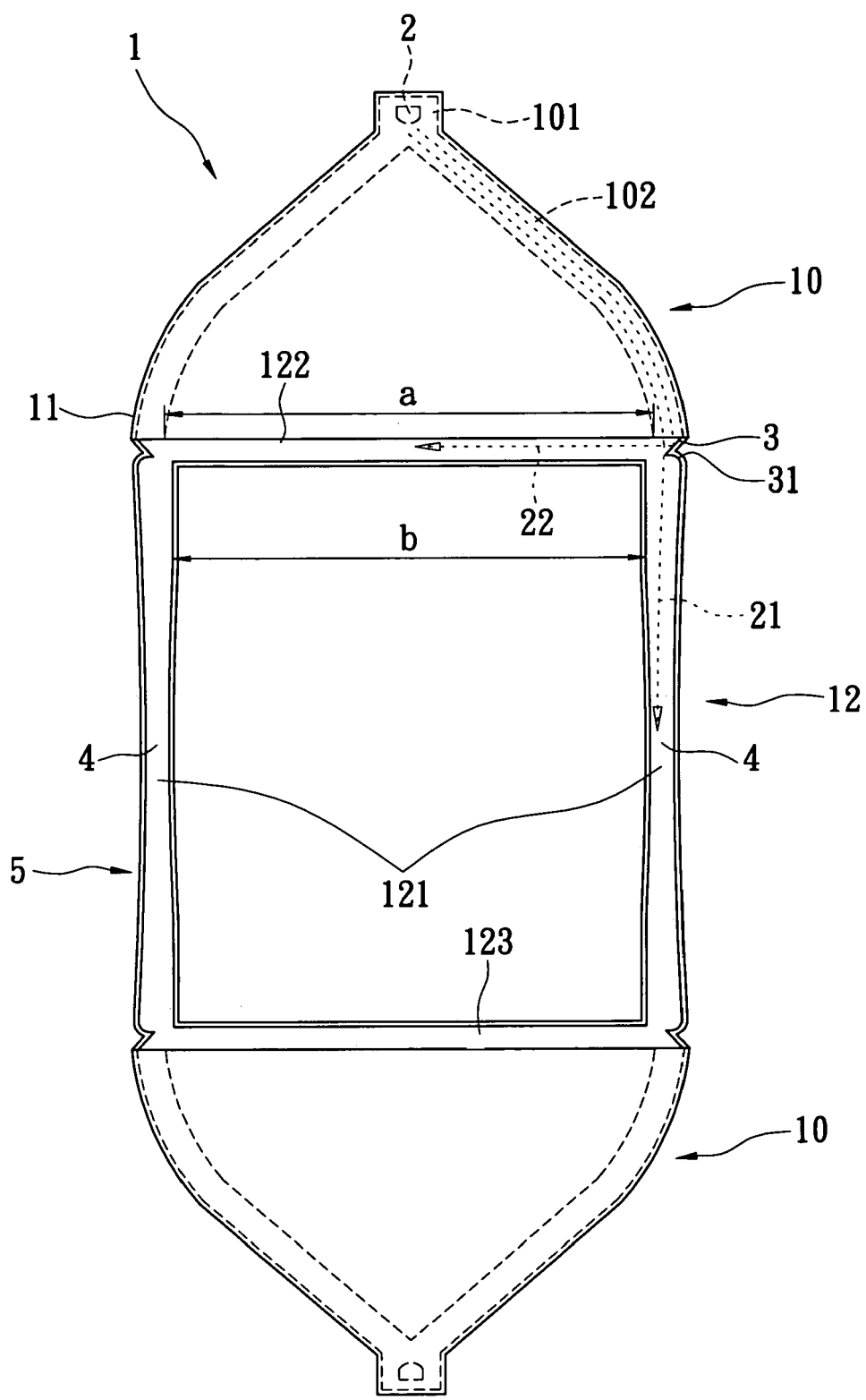
FIG. 4 is a perspective view of a fourth embodiment of the present invention.

Furthermore, the light-guide member 12 may be connected to additional forked lighting member 10 to increase the luminance thereof. Referring to FIG. 4, the light-guide member 12 is in a rectangular-frame shape, and the number of the forked lighting members 10 is two. The two forked lighting members 10 are symmetrically positioned at opposing sides of the rectangular light-guide member 12 and respectively are connected to the second light-guide stripe 122 and a third light-guide stripe 123. The second light-guide stripe 122 and the third light-guide stripe 123 each has two reflecting faces 3 disposed at two ends thereof and respectively connected to the tracks 102. Each of the reflecting faces 3 has a plurality of round corners. As the result, the light follows both along the first path 21 and the second path 22. The two first light-guide stripes 121 each has a gradually-narrowing section 4 in the middle thereof to keep the high uniformity of the emitted light.

The present invention uses the light-guide member 12 which may have various predetermined shapes to provide the displaying areas 5 of different shapes. The number of the lighting members 2 is reduced to lower the manufacturing cost. The light is uniformly transmitted in the light-guide member 12 as the result of reflection at the reflecting faces 3 arranged at predetermined locations thereat. The present invention further uses more than one lighting member 12, like two, to increase luminance of the light-guide member 12. The present invention should be applied to not only consumable electrical goods but also products for recognizing or indicating.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light guiding frame for a backlight module having at least one lighting member, the light guiding frame comprising:
   at least one forked lighting member including a containing portion receiving said at least one lighting member and a plurality of tracks extending from the containing portion;
   a light-guide member connected to said at least one forked lighting member, said light-guide member including a plurality of light-guide stripes arranged in a predetermined fashion each with respect to the other to define a predetermined shape of said light-guide member, each of said plurality of the light-guide stripes being coupled to a respective one of said plurality of the tracks to receive light transmitted therethrough from said at least one lighting member; and
   a reflection member enclosing said at least one forked lighting member and further extending to predetermined areas of said plurality of said light guide stripes of said light-guide member to define a light emitting displaying area of said light guiding frame, said light emitting displaying area extending continuously along substantially the entire length of said plurality of the light-guide stripes and contoured in correspondence to said predetermined shape of said light-guide member.

2. The light guiding frame of claim 1, wherein said at least one lighting member includes an LED.

3. The light guiding frame of claim 1, wherein said light-guide member includes two first light-guide stripes and a second light-guide stripe connected to said two first light-guide stripes at first ends thereof to form a U-shaped light guide member; wherein opposite ends of said second light-guide stripe are connected to respective pair of said plurality of the tracks; wherein said two first light-guide stripes respectively have two inner side edges spaced apart a predetermined first distance; and wherein two outmost of said plurality of the tracks and said second light-guide stripe together outline an inner triangle, the length of a bottom line of the inner triangle defined as a second distance between inner sides of said outmost pair of the tracks being longer than said first distance.

4. The light guiding frame of claim 3, wherein said second light-guide stripe includes a plurality of reflecting faces respectively corresponding to said plurality of the tracks.

5. The light guiding frame of claim 4, wherein each of said reflecting faces is angled in a predetermined fashion to adjust luminous flux in said second light-guide stripe.

6. The light guiding frame of claim 4, wherein each of said reflecting faces further includes a plurality of round corners associated therewith.

7. The light guiding frame of claim 1, wherein said light-guide member includes two first light-guide stripes, a second light-guide stripe connected to first ends of said two first light-guide stripes, and a third light-guide stripe connected to two second ends of said two first light-guide stripes, thereby forming rectangularly shaped said light-guide member.

8. The light guiding frame of claim 7, wherein said second light-guide stripe is connected by the opposite ends thereof to outmost pair of said plurality of the tracks, wherein said two first light-guide stripes respectively have two inner side edges spaced apart a predetermined first distance, wherein said outmost tracks and said second light-guide stripe together outline an inner triangle, and wherein a bottom line of the inner triangle defined as a distance between inner sides of said outmost pair of the tracks is longer than said first distance.

9. The light guiding frame of claim 8, wherein said second light-guide stripe has a plurality of first reflecting faces respectively corresponding to said plurality of the tracks, and said third light-guide stripe has a plurality of second reflecting faces respectively disposed en at two ends thereof.

10. The light guiding frame of claim 9, wherein said first and said second reflecting faces are angled in a respective predetermined fashion to adjust a luminous flux in said second and third light-guide stripes.

11. The light guiding frame of claim 9, wherein each of said first and second reflecting faces further includes a plurality of round corners associated therewith.

12. The light guiding frame of claim 9, wherein said third light-guide stripe has a gradually-narrowing section formed in the middle thereof to attain high uniformity of the emitted light.

13. The light guiding frame of claim 7, further including an auxiliary said forked lighting member respectively connected to said third light-guide stripe and said first light-guide stripes opposingly to said at least one forked lighting member; said two first light-guide stripes respectively have two inner side edges thereof, wherein said auxiliary forked lighting member includes a plurality of auxiliary tracks, wherein outmost of said plurality of the auxiliary tracks and said third light-guide stripe together outline an inner triangle, and wherein a distance between said two inner side edges of said first light guide stripes is shorter than a bottom line of the inner triangle defined as a distance between inner sides of said outmost auxiliary tracks.

14. The light guiding frame of claim 13, wherein each of said second and third light-guide stripes includes a plurality of reflecting faces respectively corresponding to said tracks of said at least one forked lighting members and said auxiliary tracks.

15. The light guiding frame of claim 13, wherein each of said two first light-guide stripes includes a gradually-narrowing section formed in the middle thereof to attain high uniformity of the emitted light.

16. The light guiding frame of claim 1, wherein said reflection member encloses a side surface of said light-guide member.

17. The light guiding frame of claim 1, wherein said reflection member encloses a bottom surface of said light-guide member.

* * * * *